Patented June 25, 1946

2,402,759

UNITED STATES PATENT OFFICE 2,402,759

METHOD OF MANUFACTURING LUMINESCENT MATERIAL

Humboldt W. Leverenz, South Orange, N. J., assignor to Radio Corporation of America, a corporation of Delaware No Drawing. Application January 31, 1942, Serial No. 429,107

6 Claims. (Cl. 252—301.4)

My invention relates to the preparation of sulphide, seleno-sulphide, sulpho-selenide, and selenide phosphors and particularly to improvements in the thermo-synthesis of such phosphors.

It is known that certain halide fluxes such as ammonium-chloride, sodium-chloride and potassium-chloride may be used individually or in pairs in the synthesis of sulphide and selenide phosphors. Such fluxes aid the thermo-crystallization of the phosphor and promote the attainment of efficient phosphors but must be chosen in kind and amount to give the desired effect according to the kind of sulphide with which the particular flux or fluxes are used. In the manufacture of sulphide phosphors, particularly those used in the preparation of luminescent screens in cathode ray aircraft position and distance indicating equipment, the efficiency, color response and crystal size must be controlled within relatively narrow limits to obtain a phosphor or phosphor combination having long persistence characteristics with a minimum of fluorescence so that the trajectory of an approaching aircraft may be observed over relatively long periods of time.

I have found in accordance with my invention that the thermo-crystallization of a sulphide, seleno-sulphide, sulpho-selenide or selenide phosphor as well as the color response and efficiency of such materials may be controlled and regulated by fluxing the constituents of the phosphor prior to thermo-crystallization with a plurality of at least three fluxing agents. More particularly in accordance with my invention, I utilize at least three fluxes, at least one of which is chosen from each of the three groups of fluxes consisting of an alkali metal halogen, an alkaline earth metal halogen and a hydrogen-containing halogen. I use this term "hydrogen-containing halogen" to define a material which freely ionizes in an aqueous solution, examples of such a flux being hydrogen fluoride, chloride, bromide or iodide and similar fluxes wherein the hydrogen of the above halides comprises an ammonium or phosphide radical. I refer in the following description of my invention to Group I fluxes to specify the alkali metal halides, to Group $I_A$ fluxes to specify hydrogen-containing halides and to Group II fluxes to identify alkaline earth metal halide fluxes. The phosphor fluxes classified in Group I promote crystal growth and are more effective in promoting such crystal growth during thermo-synthesis than the fluxes of the remaining groups, whereas Group $I_A$ phosphor fluxes aid in the phosphor synthesis, allowing lower crystallization temperatures to be used but producing smaller crystals. Those fluxes identified as Group II are effective in providing a resultant phosphor with high secondary electron emission characteristics as well as promoting crystal growth, although to an extent less than the crystal growth promoted by the Group I phosphor fluxes. Thus, in order to control the crystal growth during thermo-synthesis and yet preserve the beneficial effects induced by the Group I and Group II fluxes, I include at least one flux of the type specified as Group $I_A$. The use of at least one flux chosen from each of the three groups allows attainment of smaller crystal phosphors without undesirable loss in phosphor efficiency. In addition, the emission and absorption spectra which must be controlled in the preparation of phosphors for the applications referred to above may be varied by the inclusion of Group $I_A$ fluxes in addition to the Group I and II fluxes. Thus, the inclusion of Group $I_A$ fluxes shifts the emission and absorption spectra toward the blue and violet and offers means to control these factors without variation in the constituents of the phosphor.

As an example of my invention I will refer to a yellow-emitting zinc-cadmium sulphide, although it will be appreciated that selenium may be substituted in whole or in part for the sulphur in this example. In addition, while I will refer specifically to the use of copper as an activator, various other multivalent activators such as silver and gold may be used individually or with the silver activator. Furthermore, the specific proportions given may be varied over wide limits, the proportions of the three fluxes being chosen in accordance with the above-mentioned producible characteristics. Thus, for example, I mix 86 grams (g.) of the purest obtainable zinc sulphide with 14 g. of the purest obtainable cadmium sulphide, 1 g. of a flux selected from Group I, 1 g. of flux selected from Group $I_A$ and 1 g. of flux selected from Group II. More particularly, these fluxes may consist of sodium chloride, ammonium chloride and barium chloride chosen respectively from the three groups. I grind these materials and mix well and moisten with an aqueous solution of copper chloride to the equivalent of 0.007 g. of copper. I prefer to utilize a relatively concentrated solution of the copper chloride and I then add sufficient pure water to make a paste which I stir thoroughly and evaporate to dryness at a temperature of from 90 to 160° C. Following this evaporation I break the material up, mildly grind and mix, and place the material in a clean quartz crucible. I cover the crucible and place it with its contents in an electric resistance furnace, preferably at or near room temperature, and raise the temperature to approximately 1250° C. in about one to one and a half hours. Following this firing I remove the crucible and contents from the hot furnace and allow the contents to cool rather rapidly, in fact, the phosphorescent properties of the material may be improved by quenching the material in water immediately upon withdrawal from the furnace.

As a further example I refer to a phosphor material of the activated zinc sulphide type wherein the initial ingredient proportions may be; zinc sulphide, 100 g.; potassium bromide, 3 g.; barium chloride, 1 g.; ammonium chloride, 0.5 g., with an activator such as silver nitrate, the weight of activator being 0.015 g. calculated on the weight of silver. The procedure may be identical to that given above in the case of a zinc-cadmium sulphide except that the thermo-synthesis is at a somewhat higher temperature such as 1270° C. for a total heating period of one and a half hours.

Following the removal of the crucible and contents and cooling either rapidly while in the crucible or quenching as indicated above, the resultant phosphor mass is preferably washed vigorously in alternate washings of hot doubly distilled water and hot doubly distilled water containing, or saturated with, hydrogen sulphide. As more fully described in my copending application, Serial No. 428,228, filed January 26, 1942, I have found that such washing in an aqueous solution of hydrogen sulphide provides highly desirable non-flocculent and free-flowing properties, especially when the phosphor crystals are small as induced by the use of Group $I_A$ fluxes. The hydrogen sulphide-saturated water may be prepared by saturating the water with hydrogen sulphide at a low temperature, for example, between 0° C. and room temperature, the water being warmed only after being poured over the phosphor. The alternate washings are continued until the halide content of the wash water is negligible and preferably less than 0.001 percent by weight of the wash water. The phosphor material is then dried and is ready for use, or the material may be placed in a clean ball mill and rolled with small pyrex balls, preferably in an aqueous solution containing hydrogen sulphide, merely to break the aggregates without reducing the particle size of the individual phosphor crystals. The material, ready for use, may be applied as cathode ray tube screens or may be used for coatings in luminescent lamps or for whatever application desired. Obviously, my material may be mixed to form a mechanical mixture with any other phosphor material to provide mixed materials having wide spectral emission ranges.

As an example of the crystal size control afforded by my invention, I cite the following rule: To decrease crystal size the relative proportion of Group $I_A$ flux or fluxes with respect to the total fluxes added should be increased. I have found that zinc sulphide phosphors have a smaller tendency to form large crystals than do zinc-cadmium sulphide phosphors, as indicated in the above examples in which a smaller amount of ammonium chloride flux was used in the preparation of the zinc sulphide phosphor than in the preparation of the zinc-cadmium sulphide phosphor. Thus, the Group $I_A$ flux is added to the zinc-cadmium sulphide to decrease the otherwise normal crystal growth, whereas the Group $I_A$ flux is reduced in amount in the case of a zinc sulphide phosphor to thereby limit the induced crystal growth to a smaller degree, inasmuch as such a phosphor is normally of smaller crystal size. The total proportion of all fluxes with respect to the weight of the phosphor may be varied from 0.1 percent to 20 percent depending upon the phosphor composition and crystallizing conditions prevailing during thermo-synthesis. At a total flux content of 2 per cent, the ratio of Group $I_A$ flux content to total flux content may vary from 1 to 10, and upon decreasing the total flux content of 0.1 percent this ratio preferably varies from 1 to 10 down to 1 to 3. Similarly, in increasing the total flux content from 2 to 20 percent the range of this ratio may vary from 1 to 10 up to 1 to 20. Thus, the minimum amount of the hydrogen-containing halide is preferably proportionate to the total flux weight and is at least from $\frac{1}{20}$ to $\frac{1}{3}$ of the total weight of the fluxes over a range of total weight of said fluxes from 20 percent to 0.1 percent based on the weight of the phosphor constituents. Furthermore, the total flux content used in the preparation of zinc sulphide phosphors may be somewhat greater than in the preparation of zinc-cadmium sulphide-phosphors, while the Group $I_A$ flux may be less, within the above limits in the preparation of zinc sulphide phosphors than in zinc-cadmium sulphide phosphors. I have likewise found that a relatively high proportion of Group $I_A$ flux content within the above limits is beneficial in minimizing oxidation of the phosphor material during thermo-synthesis, some of the fluxing material being vaporized and displacing the normal atmosphere within the crucible and over the phosphor constituents. However, the thermo-synthesis may be accomplished in a neutral, oxidizing, or reducing atmosphere depending upon the ultimately desired properties of the phosphor. Thus, I have found that thermo-synthesis performed in an oxidizing atmosphere provides a phosphor having somewhat longer and more intense phosphorescence, whereas a reducing atmosphere tends to decrease the phosphorescence over that obtained with a neutral atmosphere. Furthermore, the crystallization temperature may be varied over a wide range such as from 700° C. to 1500° C. depending upon the time of firing. The pressure to which the material is subjected during firing may also vary from 0.0001 to 20,000 atmospheres, the best results usually being obtained near or above atmospheric pressure. The phosphors made in accordance with my invention may also be provided with additions of elements or compounds thereof which have large atomic or ionic radii to even further enhance the secondary electron emission of the phosphor.

While I have indicated the preferred embodiments of my invention of which I am now aware and have also indicated only a few specific applications for which my invention may be employed, it will be apparent that my invention is by no means limited to the exact forms illustrated or the use indicated, but that many variations may be made in the particular method used and the purpose for which it is employed without departing from the scope of my invention as set forth in the appended claims.

I claim:

1. The method of preparing a luminescent phosphor of a metal compounded with an element selected from the group of elements consisting of sulphur and selenium which includes the steps of firing the constituents of said phosphor in the presence of at least three fluxes, one of which is selected from each of the three groups of fluxes consisting of an alkali metal halide, an alkaline earth metal halide and a hydrogen containing halide.

2. The method of preparing a zinc sulphide phosphor comprising the steps of firing the constituents of said phosphor at a temperature between 700 and 1400° C. in the presence of at least three different halides one of which is selected from each of the three groups of halides comprising the alkali metal, alkaline earth metal and hydrogen containing halides.

3. The method of preparing a luminescent phosphor of a metal compounded with an element selected from the group of elements consisting of sulphur and selenium as constituents which includes the steps of firing the constituents of said phosphor in the presence of at least three fluxes having a total weight of from 0.1% to 20% based on the weight of said constituents, one of said fluxes being selected from each of the three groups of fluxes consisting of the alkali metal halides, the alkaline earth metal halides and the hydrogen containing halides, the ratio of the hydrogen-containing flux to the total amount of the three fluxes during the initial stage of said firing varying from 1–20 such that for a total flux content of 0.1 percent to approximately 2 percent the said ratio is between 1 to 3; for a total flux content of 2 percent ratio is between 1 to 10; and for a total flux content of approximately 2 percent to 20 percent said ratio is between 1 to 20, said flux contents being based on the weight of said constituents.

4. The method of preparing a luminescent phosphor of a metal compounded with sulphur and selenium as constituents and wherein the ratio of sulphur to selenium varies between zero and infinity, the steps of mixing with said constituents at least three fluxes, one of which is selected from each of the three groups of fluxes consisting of the alkali metal halides, the alkaline earth metal halides and the hydrogen-containing halides, the minimum amount of said hydrogen-containing halide being proportionate to the total flux weight and at least from $1/20$ to $1/3$ of the total amount of said fluxes by weight, over a range of total weight of said fluxes from 20 percent to 0.1 percent based on the weight of said constituents, firing the mixture of constituents and fluxes to crystallize said constituents and washing the product of firing to remove a large portion of said fluxes from said product.

5. The method of preparing a metal sulphide phosphor comprising mixing the constituents of the phosphor with finite quantities of a plurality of fluxes selected from each of the three halides of an element selected from the group consisting of the alkali metals, alkaline earth metals, and hydrogen, the total amount of said fluxes being from substantially 0.1 percent to 2 percent of the constituents by weight, the hydrogen halide flux being at least one-third of the total flux by weight, firing the mixture at a temperature between 700 and 1400° C. for a sufficient length of time to crystallize said constituents and washing the product of firing in a solution containing hydrogen sulphide to remove substantially all of the fluxes and provide a free-flowing non-flocculent material.

6. The method of preparing a metal sulphide phosphor as claimed in claim 6 wherein the total amount of said fluxes mixed with said constituents is substantially from 2 percent to 20 percent of the weight of said constituents, and the said hydrogen halide is at least one-tenth of the total flux by weight.

HUMBOLDT W. LEVERENZ.